July 16, 1957     M. A. KNAPP     2,799,521

SWIVEL JOINT

Filed March 30, 1954

Marion A. Knapp
INVENTOR.

BY *Clarence A. O'Brien*
*and Harvey B. Jackson*
Attorneys

United States Patent Office 2,799,521
Patented July 16, 1957

2,799,521
SWIVEL JOINT

Marion A. Knapp, Mansfield, Ohio

Application March 30, 1954, Serial No. 419,701

1 Claim. (Cl. 285—281)

This invention relates to a swivel joint and more specifically provides such a joint between adjacent threaded ends of pipes.

An object of this invention is to provide a swivel joint which is simple in construction, easy to apply, efficient in operation, long lasting, well adapted for its purposes and relatively inexpensive to manufacture.

Another object of this invention is to provide a swivel joint for connecting pipes containing water, steam, oils, alkalies and other solvents including an adapter rotatably secured to the body of a pipe joint and provided with a seal effective at a temperature up to 500° F. and impervious to most acids, alkalies and solvents.

A still further object of this invention is to provide a swivel joint of novel construction wherein the sealing effect between a joint body and a rotatable adapter secured thereto may be adjusted as desired.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
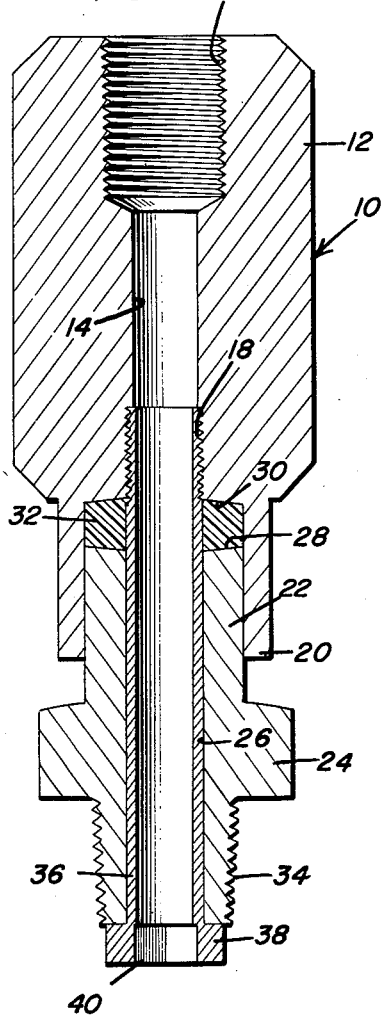
Figure 1 is a longitudinal, vertical section taken substantially along a plane through the longitudinal center line of the swivel joint of the present invention.
Figure 2:
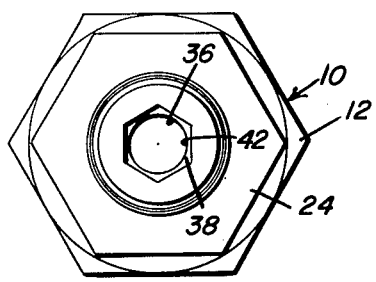
Figure 2 is a bottom plan view of the construction of Figure 1.
Figure 3:
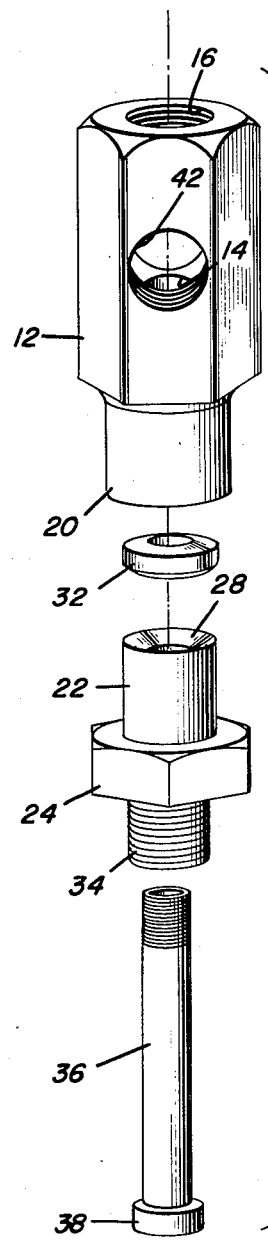
Figure 3 is a group perspective showing the various elements of the swivel joint in disassembled position and in their assembled relation.

Referring now specifically to the drawings, it will be seen that the numeral 10 generally designates the swivel joint of the present invention and includes a body 12 having a polygonal shape and generally elongated. The body 12 is provided with an elongated longitudinal bore 14 extending therethrough and the portion of the bore 14 adjacent one end thereof is enlarged and internally threaded, as indicated by the numeral 16. The other end of the bore 14 is also internally threaded, as indicated by the numeral 18 and is substantially the same size as the central portion of the bore 14. A peripheral flange 20 extends from one end of the body 12 and forms a sleeve for slidably and rotatably receiving the shank 22 of an adapter or connector 24 which is provided with a longitudinal bore 26 therethrough. When the shank 22 of the adapter 24 is positioned within the sleeve 20, the bores 26 and 14 are in longitudinal alignment. It will be seen that the adapter 24 is provided with a polygonal section for the engagement of a suitable wrench or other tool for manipulating the swivel joint 10. The inner end of the shank 22 of the adapter 24 is tapered, as indicated by the numeral 28, and the corresponding edge of the body 12 is tapered, as indicated by the numeral 30.

An annular ring of sealing material 32 which is provided with complementary tapering edges for engaging the tapered ends 28 and 30 of the body 12 and adapter 24 is provided. The outer end of the adapter 24 is externally threaded, as indicated by the numeral 34, and a tubular fastening member 36 is positioned through the adapter 24 and threadedly engages the internal threads 18 on the bore 14. The tubular fastening member 36 is provided with a shoulder 38 engaging the outer end of the adapter 24 and a polygonal section 40 for receiving a polygonal wrench wherein the tubular fastener 36 may be rotated thereby moving or urging the adapter 24 towards the body 12, thereby sealing the joint between the adapter 24 and the body 12. If desirable, the body portion 12 may be provided with a side opening 42 for attaching other pipes thereto, as may become necessary. Further, it will be seen that any suitable device may be utilized for engaging the tubular fastening member 36 with a suitable tool, such as a slot or the like for receiving a screwdriver or similar tool. The various components of the swivel joint 10 may be constructed of brass or any suitable material which may be utilized in various types of piping systems. The sealing material 32 is constructed of a suitable preformed material, such as "Teflon" which is manufactured by Du Pont, Inc. It will be understood that relative rotation between the body 12 and the adapter 24 permits the swivel joint 10 to be positioned in a pipe line easily and quickly and which also effectively seals itself and permits relative rotation as may become necessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A swivel pipe joint comprising an elongated body having a longitudinal bore comprising threaded end portions, a coaxial sleeve integral with one end of said body, an adapter having one end portion slidably and rotatably engaged in the sleeve, said body and said adapter including reversely beveled opposed ends, a headed connecting tube extended slidably and rotatably through the adapter and having one end threadedly engaged in the body, the bore of said tube having an outer end portion for the reception of an actuating tool, with the headed end engaging the outer end of the adapter for retaining the adapter on the connecting tube and a compressible seal encircling the tube and substantially filling the area between said opposed ends of said body and said adapter.

References Cited in the file of this patent

UNITED STATES PATENTS

| | | |
|---|---|---|
| 769,106 | McCarthy | Aug. 30, 1904 |
| 873,801 | Sizemore | Dec. 17, 1907 |
| 1,021,378 | Schulz | Mar. 26, 1912 |
| 1,514,276 | Whalen | Nov. 4, 1924 |
| 1,969,531 | Swedler | Aug. 7, 1934 |
| 2,101,938 | Giberson | Dec. 14, 1937 |
| 2,542,701 | Press | Feb. 20, 1951 |

FOREIGN PATENTS

| | | |
|---|---|---|
| 70,042 | Germany | 1893 |
| 50,667 | France | Nov. 12, 1940 |